Figure 1:
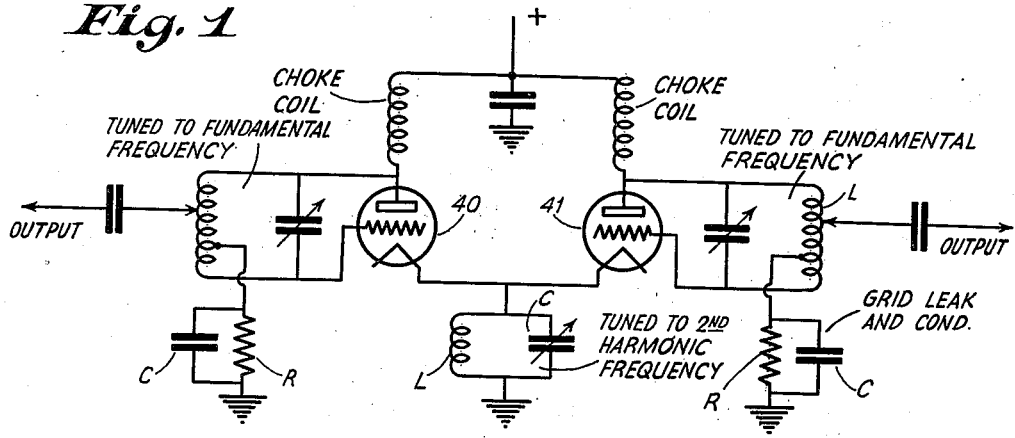

Nov. 9, 1937.   C. W. HANSELL   2,098,386
OSCILLATION GENERATOR
Original Filed Aug. 1, 1933   2 Sheets—Sheet 1

INVENTOR
C. W. HANSELL
BY
ATTORNEY

Nov. 9, 1937.  C. W. HANSELL  2,098,386
OSCILLATION GENERATOR
Original Filed Aug. 1, 1933  2 Sheets-Sheet 2
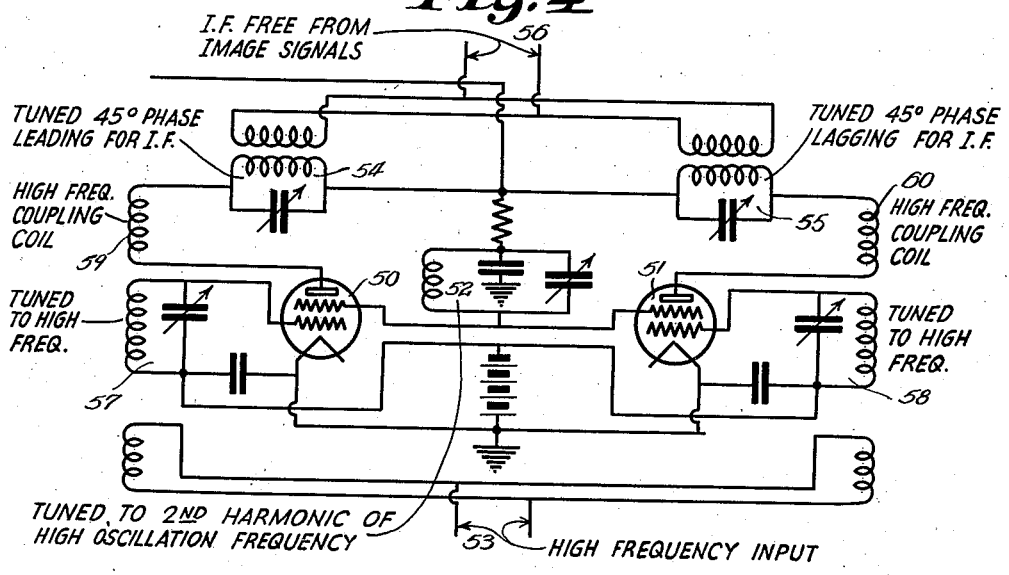
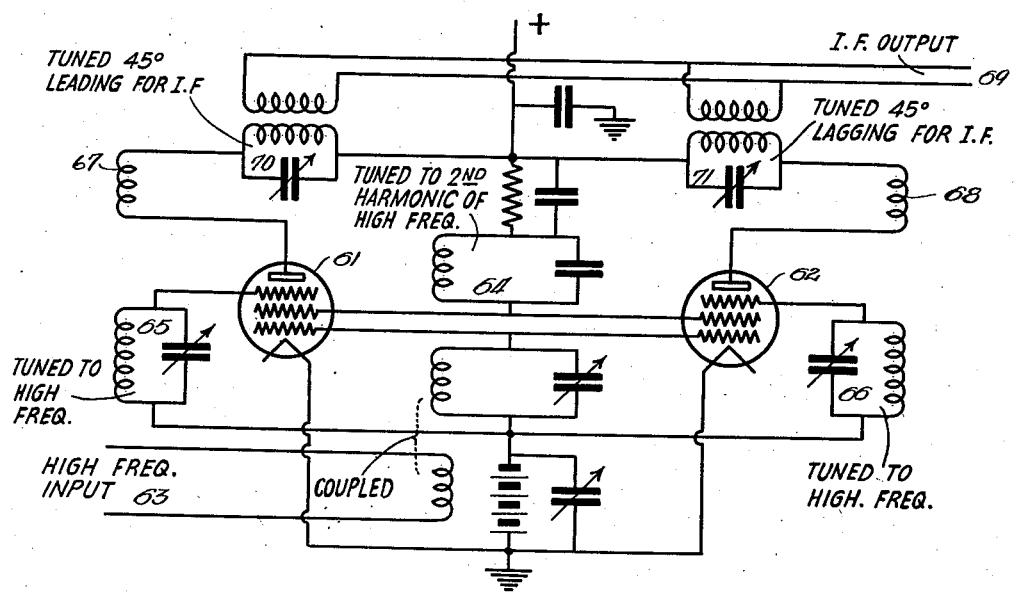
INVENTOR
C.W. HANSELL
BY
ATTORNEY Patented Nov. 9, 1937

2,098,386

UNITED STATES PATENT OFFICE 2,098,386

OSCILLATION GENERATOR

Clarence W. Hansell, Port Jefferson, Long Island, N. Y., assignor to Radio Corporation of America, a corporation of Delaware Original application August 1, 1933, Serial No. 683,115. Divided and this application May 24, 1935, Serial No. 23,171. In Canada June 29, 1934

13 Claims. (Cl. 250—36)

This invention relates to high frequency oscillation circuits and has for its primary object to provide a circuit which can maintain a desired phase relation between a plurality of electric tube oscillators. The application is a division of my United States Patent No. 2,044,745, granted June 16, 1936, on an application filed August 1, 1933.

In general, the present invention comprises a plurality of electric tube oscillators having associated therewith a circuit tuned to a desired harmonic for determining the phase relation at which the oscillators will function. This circuit presents a high mutual impedance for the desired harmonic of the oscillation frequency and forces the oscillating tubes to avoid the phase relation which would build up appreciable potential across the tuned circuit. In other words, there is a degenerative effect in the electric tube oscillator circuits for the particular harmonic, or a reduction in output at the fundamental frequency, in which case the tubes always tend to select the phase relation which will give maximum output and efficiency. By changing the tuning of the harmonic circuit, the phase relation of the two oscillators can be shifted to any one of a number of normal phase relations. For example, if the circuit is tuned to the second harmonic, there will normally be obtained a 90° phase relation between tube oscillators; if tuned to a third harmonic, there will be obtained a 60° relationship; if tuned to a fourth harmonic, a 45° relation; if tuned to a fifth harmonic, a 36° relation, etc. Also, by varying the adjustments of the individual circuits around the fundamental frequency, slight variations from the phase relations just stated may be obtained or the stated phase relations may be obtained more exactly.

Although the systems hereinafter described are designed primarily to produce energy having a 90° phase relation over a desired band of frequencies, it is to be distinctly understood that the invention is not limited to this exact relationship since the principles may also be applied, as mentioned above, to obtain other phase relationships.

Referring to the drawings, Figs. 1–5, inclusive, show various circuit schemes whereby oscillators may be made to give a 90° phase relationship over a wide band of frequencies.

Fig. 1 shows a scheme for holding the oscillators in synchronism with a phase relation of substantially 90°, regardless of variations in their frequency. This arrangement gives the oscillators a fixed 90° phase relation over any range of frequencies by coupling the two oscillators 40 and 41 in such manner that their second harmonics are always held substantially 180° out of phase. In this way their fundamental frequencies, of necessity, are always at half this phase difference or at 90°.

Second harmonic coupling is obtained in Fig. 1 by inserting a common circuit, tuned approximately to the second harmonic frequency, between the cathodes of the two tubes 40, 41 and ground, or the negative side of the anode circuit power supply system. Preferably, the coupling between the oscillators at the fundamental frequency is small, though some coupling is permitted and may be beneficial in determining which of the oscillators will assume a leading phase relation. The effect of the circuit shown tuned to the second harmonic (or any other harmonic, if desired) is to insert a strong degenerative effect at the second harmonic frequency into each oscillator circuit taken alone. In other words, it tends strongly to reduce the strength of oscillation in each oscillator. However, when both oscillators are active they both balance out second harmonic currents in the circuit tuned to the harmonic and thus each permits the other to oscillate full strength, without second harmonic degeneration. This full strength oscillating condition will be assumed automatically by the two oscillators 40 and 41 and, consequently, their second harmonics are held at 180° phase relation, which corresponds to 90° phase relation from the fundamental. In other words, when the circuit tuned to the second harmonic has voltage built up in it, the reaction of this voltage of the two oscillation tubes is equal and in the same phase, but with respect to the fundamental frequency oscillations the second harmonic energy is somewhat leading in phase with respect to the fundamental frequency for one tube and somewhat lagging in phase with respect to the fundamental frequency for the other tube. This difference in phase relation modifies the phases of the anode currents in the tubes in a direction tending to reduce the phase differences between the fundamental frequency currents. In this way the tubes tend to avoid the relationship which will build up strong second harmonic voltages in the circuit.

It is preferred in the circuit arrangement just described that all variable condensers shown be controlled by one shaft or knob. Also, the two tubes 40, 41 will ordinarily have their circuits constructed and adjusted almost alike though they may deliberately be made slightly different when it is desired to make one tube or the other always assume a leading phase relation with respect to the other.

It will be noted that the accuracy of phase control between the two oscillators is only slightly dependent upon the tuning of the second harmonic circuit, it only being necessary that the circuit develop considerable harmonic frequency impedance. As a result, the system has no critical adjustments and is quite practical to construct and operate. Obviously, other detailed circuit arrangements may be used instead; for example, the harmonic frequency tuned circuit may be inserted in series with the positive or anode end of the power supply circuit instead of in the negative or cathode end. Also, any other known type of oscillator circuit may be used.

If the oscillators 40 and 41 are used directly as detectors, the high frequency input may be coupled to them and intermediate frequency circuits inserted in series with the anode supply leads.

An alternative to the arrangement of Fig. 1 may be set up with two relaxation oscillators or frequency dividers having their frequency controlled by a double frequency oscillator, output from which would be applied to the frequency dividers 180° out of phase. If tripping tube or glow tube, condenser, resistance frequency dividers are used, the resistances can be uni-controlled with the oscillator condenser to hold correct relative adjustments over a large range of frequencies.

Figs. 2–5, inclusive, utilize auxiliary electrodes for second harmonic synchronization of oscillators at the 90° phase relation.

Figure 2:
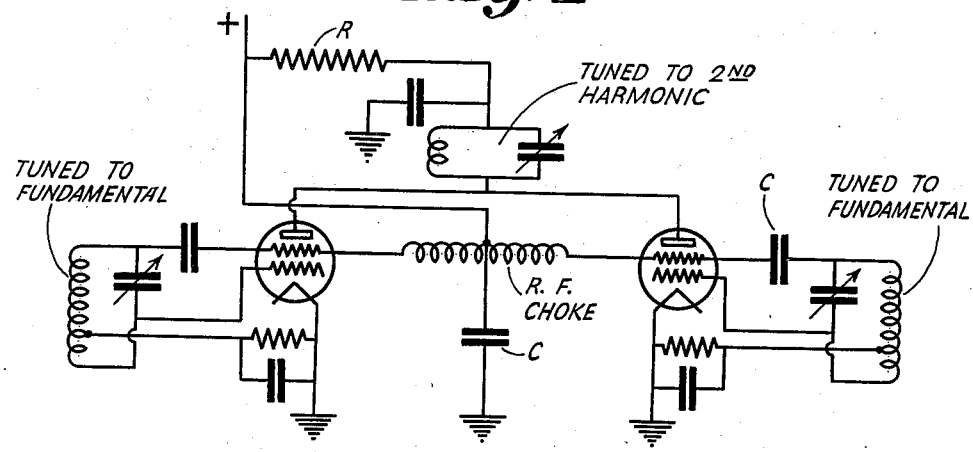

Fig. 2 shows two oscillator circuits in which the screen grids of four electrode tubes are used as anodes. In the circuit the plates of the tubes are connected in parallel and then placed in series with a circuit tuned to the second harmonic of the oscillator frequency. In order that the second harmonic circuit may lock the oscillators in step at 90° phase relation, it is necessary for the second harmonic circuit to cause a reduction in oscillator power except when the second harmonics are 180° out of phase. In other words, the building up of oscillations in the second harmonic circuit must reduce the current flow to the screen grids. Since the second harmonic circuit, when oscillating, reduces the anode voltage, simultaneously with reduction in screen grid voltage from the fundamental frequency oscillation, we must have conditions which cause a reduction in screen grid current with reduction in anode voltage. We may obtain this condition by making the anode direct current voltage positive but much less than the screen grid direct current voltage so that, due to "dynatron" effect a considerable portion of the screen grid current is furnished by secondary emission from the plate. Then oscillation at second harmonic frequency, in the second harmonic circuit, reduces the anode voltage at the times when electron currents are flowing in the tube and so reduces the current to the screen grid. In this case maximum power is produced in the fundamental frequency circuits when the second harmonic currents to the plates are 180° out of phase so that no second harmonic current is built up in the second harmonic tuned circuit. The oscillators automatically adjust themselves to this maximum oscillation condition, if the potentials and circuits are correctly adjusted, and so the fundamental frequency oscillations are held at 90° phase relation.

Figure 3:
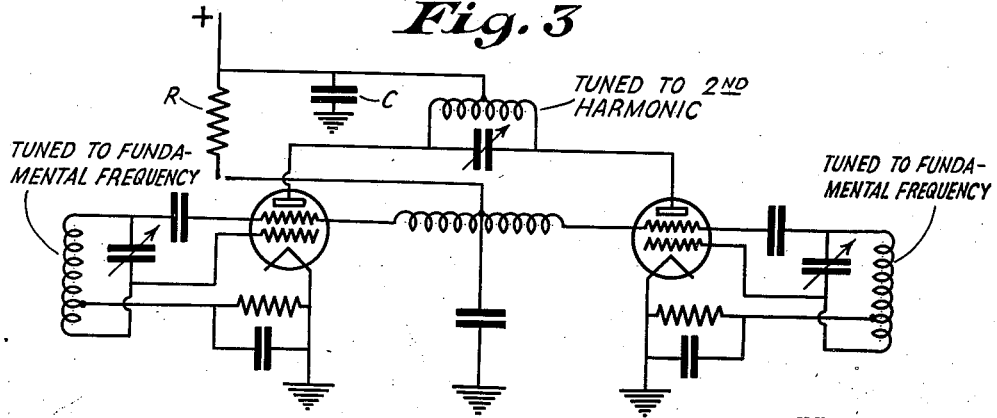

Fig. 3 shows another circuit in which the plates are maintained at a considerably higher direct current potential than in Fig. 1, so that secondary emission currents returning from anodes to screen grids is prevented. In this case the anode potentials tend to draw the electrons through and away from the screen grids in a way to greatly reduce the screen grid current and the strength of oscillations at fundamental frequency.

The second harmonic circuit in this case is connected between the plates in push-pull fashion. Now if second harmonic oscillations are set up in the circuit, when electron currents flow, the plate potentials are reduced and allow a greater flow of current to the screen grids. Then the stronger the second harmonic currents become the greater will be the power developed at the fundamental frequency in each oscillator. The second harmonic currents normally will be maximum when they are 180° out of phase on the two plates. Therefore, the system normally holds the second harmonics at 180° and the fundamental frequency oscillations at 90° phase relation.

Fig. 4 shows schematically a diagram of an image suppression system in which the invention may be used. Here two high frequency oscillators 50 and 51 are held in synchronism at 90° phase relation by means of a second harmonic tuned circuit 52 connected in series with the paralleled connections to the screen grids of two four-electrode tubes 50 and 51. In this case, unless the oscillators hold the second harmonics at 180° phase relation, oscillations are set up in the second harmonic tuned circuit which exert a strong degenerative effect, a condition which the tube circuits automatically avoid.

In this same figure there is shown an input coupling circuit 53 for a high frequency to be detected. There is also shown the intermediate beat frequency output circuits arranged to provide 90° relative phase shift in the two intermediate frequency outputs 54 and 55. Coupled to these two circuits is an intermediate frequency output circuit 56 after which may be included amplifiers, detectors, loudspeakers, recorders, etc., the operation of which will have been made relatively free from image band interference. The beats from the desired received wave band incoming over 53, reacting with the oscillations in tubes 50 and 51, are added in like phase in the output circuit 56, while at the same time the undesired image band produces beat frequencies which are opposite in phase and cancel out in output circuit 56.

Tubes 50 and 51 are self-oscillation detector circuits of the Armstrong regenerative type comprising tuned grid circuits 57 and 58, respectively coupled to anode coils 59 and 60.

Fig. 5 shows, schematically, a self-oscillating detector system using five electrode tubes 61 and 62. It will be noted that there is also shown a high frequency input 63 to the first pair of grids from the cathodes. The input grids are shielded by the next set of grids which are tuned for the second harmonic of the self-oscillation frequency by circuit 64 and are effectively grounded back to the cathodes for the fundamental frequency. Of course, appropriate circuit shielding should be used in addition.

The third pair of grids nearest the anodes and the anodes are used to produce the high frequency self-oscillations held 90° different in phase due to locking by the second harmonic developed in the circuit 64 to the second pair of grids. Tubes 61 and 62 have high frequency tuned grid circuits 65 and 66 respectively coupled to anode coils 67 and 68, thereby forming Armstrong type regenerative oscillators.

The final output from 69 is obtained from two oppositely detuned circuits 70 and 71, tuned on either side of the beat frequency between the local oscillations and the incoming signal which is to be received. Beats due to the desired band of input frequencies received over 63 add in phase in the output circuit 69, while the beats due to undesired image band of frequencies oppose and cancel in the output circuit 69.

It will be apparent that many modifications may be made in the circuits above described without departing from the present invention. For example, in the oscillator circuit shown, various trimmer adjustments may be provided for balancing exactly the undesired image frequency energies. The trimmers for adjustment of phase may operate on the tuning of the high frequency oscillating circuits differentially or upon the tuning of the two intermediate frequency output circuits differentially. Relative amplitudes may be adjusted accurately by differential variation of high frequency input or intermediate frequency output couplings or by differential adjustments of vacuum tube electrode potentials.

In practice, since the intermediate frequency circuits may always operate in a fixed or relatively fixed frequency band they do not require adjustments in operation other than perhaps some trimmer adjustments of phase and amplitude for exactly balancing image band interference. The high frequency circuits, including the second harmonic circuit should preferably be controlled by a single tuning dial.

The circuits of Figs. 2, 4, and 5, and others like them where a single ended, or unbalanced second harmonic circuit is used which requires no transformer action, may very well operate well enough for many practical purposes by inserting a resistance in place of the tuned circuit. In cases where this can be done, the tuning system will be simplified through the elimination of one variably tuned circuit.

It is to be distinctly understood that the present invention is not limited to the precise arrangements shown but that various modifications may be made without departing from the spirit and scope of the appended claims.

What is claimed is:

1. The method of obtaining a desired phase relation between the outputs of a plurality of electric tube oscillators which comprises utilizing harmonic frequency energy to produce a degenerative effect in said oscillators at phase relations other than the desired relation.

2. An oscillation generator circuit comprising two electric tubes each having a plurality of electrodes, means for causing said tubes to oscillate with a phase relation other than zero or 180° including an oscillatory circuit tuned to a harmonic connected to an electrode of one tube and a like electrode of the other tube, and an oscillatory circuit tuned to the fundamental frequency coupled to other electrodes of one of said tubes, and another similarly tuned oscillatory circuit coupled to like other electrodes of the other tube.

3. An oscillation generator comprising two triodes, each having an anode, cathode and grid, means for causing said triodes to oscillate at a desired phase relation including a connection directly connecting together said cathodes, a parallel tuned circuit tuned to the second harmonic of the oscillation frequency coupled to said connection and to ground, and an oscillatory circuit tuned to the fundamental frequency coupled to the anode and grid of one tube and a similarly tuned oscillatory circuit coupled to the anode and grid of the other tube.

4. An oscillation generator in accordance with claim 3 including a grid leak connected to each of said oscillatory circuits between ground and a point on said circuits intermediate the coupling terminals to the electrodes of the tubes, a source of potential and connections from the positive terminal of said source to the anodes of said tubes, each of said last connections including a choke coil for the fundamental frequency.

5. An oscillation generator circuit comprising two electric tubes each having a plurality of electrodes and at least one grid electrode, means for causing said tubes to oscillate at a desired phase relation including a connection between the grid of one tube and the like electrode of the other tube, a circuit comprised of an inductance and a condenser in parallel tuned to a harmonic connected to said grid electrodes between said connection and a source of potential, and an oscillatory circuit tuned to the fundamental frequency coupled to other electrodes of one of said tubes, and another similarly tuned oscillatory circuit coupled to like other electrodes of the other tube.

6. A system in accordance with claim 5, characterized in this that said plurality of electrodes in each of said tubes include a cathode and another grid electrode, and said oscillatory circuits tuned to the fundamental are each coupled between the cathode and said other grid of its associated tube.

7. An oscillation generator circuit comprising two electric tubes each having an anode, a cathode and a grid, means for causing said tubes to oscillate including a source of potential, a circuit tuned to a harmonic connected to the anodes of both of said tubes and located between said anodes and the positive terminal of said source, and an oscillatory circuit tuned to the fundamental frequency coupled to the cathode and grid of one tube, and a similarly tuned circuit coupled to the cathode and grid of the other tube.

8. A system in accordance with claim 7, characterized in this, that said tubes are screen grid tubes having in addition to said grid an auxiliary grid, said oscillatory circuits each comprising an inductance and a condenser in parallel therewith, the grids of each tube being coupled to opposite ends of said inductance, and the cathode of each tube to a point on said inductance intermediate the ends.

9. An oscillation generator comprising two triodes, each having an anode, cathode and grid, means for causing said triodes to oscillate at a desired phase relation including a connection directly connecting together said cathodes, a parallel tuned circuit tuned to the second harmonic of the oscillation frequency coupled to said connection and to ground, an oscillatory circuit tuned to the fundamental frequency coupled to the anode and grid of one tube, a similarly tuned oscillatory circuit coupled to the anode and grid of the other tube, a grid leak connecting each of said oscillatory circuits to ground, and individual output circuits coupled to said oscillatory circuits.

10. An oscillation generator circuit comprising two electric tubes each having a plurality of electrodes, means for causing said tubes to oscillate with a phase relation other than zero or 180° including an oscillatory circuit tuned to the second harmonic connected to an electrode of one tube and a like electrode of the other tube, an oscillatory circuit tuned to the fundamental frequency coupled to other electrodes of one of said tubes, and another similarly tuned oscillatory circuit coupled to like other electrodes of the other tube.

11. An oscillation generator circuit comprising two electric tubes each having an anode, a cathode and a grid, means for causing said tubes to oscillate including a source of potential, a circuit tuned to the second harmonic connected to the anodes of both of said tubes and located between said anodes and the positive terminal of said source, an oscillatory circuit tuned to the fundamental frequency coupled to the cathode and grid of one tube, and a similarly tuned circuit coupled to the cathode and grid of the other tube, whereby said electric tubes oscillate at a 90° phase relation with respect to each other.

12. An oscillation generator circuit comprising two electron discharge devices each having an anode, a cathode, a control grid and a screen grid, an oscillatory circuit tuned to the fundamental frequency for each of said devices, individual connections from the control grid, screen grid and cathode of each tube to different points on the oscillatory circuit for that device, a connection between the screen grids of said devices, an oscillatory circuit tuned to the second harmonic coupled in push-pull to said anodes, and means for applying different magnitudes of positive potential to said anodes and screen grids.

13. An oscillation generator comprising two electric tubes each having an anode, a cathode, a first grid and a screen grid, means for causing said tubes to oscillate with a phase relation other than zero or 180°, including a source of potential, a choke coil connecting said screen grids together, a circuit tuned to a harmonic connected to the anodes of both said tubes, a conductive connection between a point intermediate the ends of said choke coil and the positive terminal of said source, a condenser connecting said point and ground, an oscillatory circuit tuned to the fundamental frequency for each of said devices, and individual connections from the grid, screen grid, and cathode of each tube to different points on the oscillatory circuit for that tube.

CLARENCE W. HANSELL.